(12) United States Patent
Hagiwara

(10) Patent No.: US 12,631,254 B2
(45) Date of Patent: May 19, 2026

(54) SEALING DEVICE AND SEALING STRUCTURE

(71) Applicant: NOK CORPORATION, Tokyo (JP)

(72) Inventor: Naoki Hagiwara, Makinohara (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 19/046,825

(22) Filed: Feb. 6, 2025

(65) Prior Publication Data

US 2025/0264159 A1 Aug. 21, 2025

(30) Foreign Application Priority Data

Feb. 15, 2024 (JP) ................................. 2024-021162

(51) Int. Cl.
| | |
|---|---|
| *F16J 15/02* | (2006.01) |
| *F16J 15/12* | (2006.01) |
| *F16L 25/14* | (2006.01) |

(52) U.S. Cl.
CPC ........... *F16J 15/025* (2013.01); *F16J 15/121* (2013.01); *F16L 25/14* (2013.01)

(58) Field of Classification Search
CPC ........ F16J 15/025; F16J 15/104; F16J 15/121; F16J 15/122; F16L 21/002; F16L 25/12; F16L 25/14; F16L 27/113; F16L 27/1017
See application file for complete search history.

(56) References Cited

U.S. PATENT DOCUMENTS

| | | | | |
|---|---|---|---|---|
| 5,649,712 A | * | 7/1997 | Ekholm | ................... F16L 21/02 |
| | | | | 277/615 |
| 6,439,620 B1 | * | 8/2002 | Guest | ...................... F16L 33/18 |
| | | | | 285/239 |

(Continued)

FOREIGN PATENT DOCUMENTS

| | | | |
|---|---|---|---|
| DE | 8629175 U1 | 5/1987 |
| EP | 2713088 A1 | 4/2014 |

(Continued)

OTHER PUBLICATIONS

Extended European Search Report for corresponding European Patent Application No. 25156782.2 dated Jul. 2, 2025.

*Primary Examiner* — Nicholas L Foster

(74) *Attorney, Agent, or Firm* — Harness, Dickey & Pierce, P.L.C.

(57) ABSTRACT

A sealing device is configured to be provided between a first member including a first surface provided with a first space and a second member including a second surface provided with a second space having a diameter greater than a diameter of the first space, the second space facing the first surface. The sealing device includes a tubular elastic body that includes a first outer-circumferential surface facing an inner-circumferential surface defining the first space; a second outer-circumferential surface, which has a diameter greater than a diameter of the first outer-circumferential surface, facing an inner-circumferential surface defining the second space, a step surface defining a difference in level between the first outer-circumferential surface and the second outer-circumferential surface and being in contact with the first surface; an annular first protrusion protruding from the first outer-circumferential surface; and an annular second protrusion protruding from the second outer-circumferential surface.

8 Claims, 10 Drawing Sheets

(56) References Cited

U.S. PATENT DOCUMENTS

| | | | | |
|---|---|---|---|---|
| 8,083,237 B2 * | 12/2011 | Smith | ............... | F16L 21/002 |
| | | | | 277/648 |
| 8,695,988 B2 * | 4/2014 | Smith | ............... | F16J 15/125 |
| | | | | 277/625 |
| 10,788,150 B2 * | 9/2020 | Parsley | ............ | F16L 27/1017 |
| 11,333,248 B2 * | 5/2022 | Yanagi | ............... | F16J 15/025 |
| 11,391,373 B2 * | 7/2022 | Hagiwara | ............ | F16J 15/104 |
| 11,592,107 B2 * | 2/2023 | Yamamoto | ............ | F16L 5/10 |
| 11,692,630 B2 * | 7/2023 | Mancini | ............ | F16J 15/125 |
| | | | | 277/628 |
| 2009/0072494 A1 * | 3/2009 | Smith | ............... | F16J 15/125 |
| | | | | 277/625 |
| 2009/0267307 A1 * | 10/2009 | Smith | ............... | F16L 25/14 |
| | | | | 277/584 |
| 2010/0207332 A1 * | 8/2010 | Smith | ............... | F16J 15/104 |
| | | | | 277/607 |
| 2014/0091532 A1 | 4/2014 | Unger et al. | | |
| 2014/0091533 A1 * | 4/2014 | Unger | ............... | F16L 21/022 |
| | | | | 277/616 |
| 2019/0032783 A1 * | 1/2019 | Yanagi | ............... | F16J 15/12 |
| 2019/0293215 A1 * | 9/2019 | Parsley | ............ | F16L 27/1017 |
| 2021/0172524 A1 * | 6/2021 | Hagiwara | ............ | F16J 15/062 |

FOREIGN PATENT DOCUMENTS

| | | | |
|---|---|---|---|
| EP | 3708882 A1 | 9/2020 |
| JP | 2012-255470 A | 12/2012 |
| JP | 2020-041632 A | 3/2020 |
| WO | 2024-120949 A1 | 6/2024 |

* cited by examiner

SEALING DEVICE AND SEALING STRUCTURE

CROSS REFERENCE TO RELATED APPLICATION

This application is based on and claims priority from Japanese Patent Application No. 2024-021162, filed on Feb. 15, 2024, the entire contents of which are incorporated herein by reference.

BACKGROUND

Technical Field

This disclosure relates to a sealing device and to a sealing structure.

Related Art

A sealing device is proposed that is used in a connection between a first member, which has an end surface on which a flow path is open, and a second member, which has an end surface on which a flow path is open, the end surface of the second member facing the first member. For example, Japanese Patent Application Laid-Open Publication No. 2012-255470 discloses a structure in which a straight tubular joint seal is used in a connection between flow paths of pipes. However, in a conventional configuration, it is difficult to position a sealing device in an axial direction. For example, in the configuration disclosed by Japanese Patent Application Laid-Open Publication No. 2012-255470, end portions of the joint seal are in contact with step surfaces of the flow paths to position the sealing device in an axial direction. However, when an end portion of the joint seal is pressed against a step surface of the flow paths, a sealing lip of the end portion may be excessively deformed and does not maintain a target sealing performance.

SUMMARY

An object of one aspect according to this disclosure is to implement positioning of a sealing device in an axial direction to appropriately maintain a target sealing performance.

A sealing device according to one aspect of this disclosure is a sealing device configured to be provided between a first member that includes a first surface provided with a first space and a second member that includes a second surface provided with a second space having a diameter greater than a diameter of the first space, the second space facing the first surface, the sealing device comprising a tubular elastic body, wherein the elastic body includes a first outer circumferential surface facing an inner circumferential surface defining the first space; a second outer circumferential surface facing an inner circumferential surface defining the second space, the second outer circumferential surface having a diameter greater than a diameter of the first outer circumferential surface; a step surface defining a difference in level between the first outer circumferential surface and the second outer circumferential surface, the step surface being in contact with the first surface; an annular first protrusion protruding from the first outer circumferential surface; and an annular second protrusion protruding from the second outer circumferential surface.

A sealing structure according to another aspect of this disclosure includes a first member that includes a first surface provided with a first space; a second member that includes a second surface provided with a second space having a diameter greater than a diameter of the first space, the second member facing the first surface; and a sealing device provided between the first member and the second member, wherein the sealing device includes a tubular elastic body, and wherein the elastic body includes a first outer circumferential surface facing an inner circumferential surface defining the first space; a second outer circumferential surface facing an inner circumferential surface defining the second space, the second outer circumferential surface having a diameter greater than a diameter of the first outer circumferential surface; a step surface defining a difference in level between the first outer circumferential surface and the second outer circumferential surface, the step surface being in contact with the first surface; an annular first protrusion protruding from the first outer circumferential surface; and an annular second protrusion protruding from the second outer circumferential surface.

DETAILED DESCRIPTION

An embodiment according to this disclosure will now be described with reference to the accompanying drawings. In each drawing, dimensions and scales of elements may differ from those of actual products. In addition, the embodiment described below is an exemplary embodiment assumed in a case in which this disclosure is implemented. Thus, the scope of this disclosure is not limited to the embodiment described below.

A: Embodiment

Figure 1:
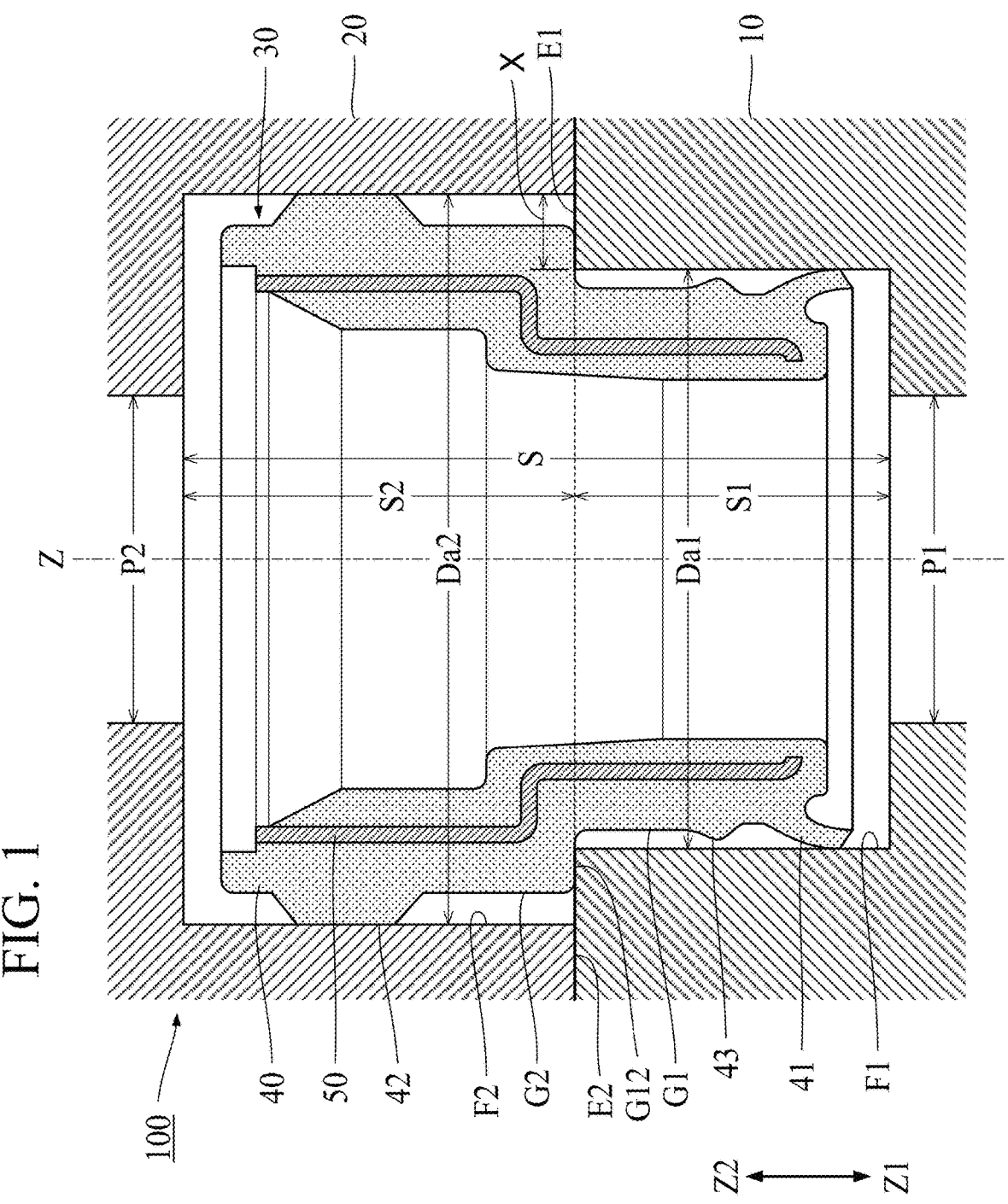
FIG. 1 is a cross section of a sealing structure according to an embodiment.

FIG. 1 is a cross section of a sealing structure 100 according to an embodiment of this disclosure. The sealing structure 100 according to this embodiment is a structure that is included in a cooling unit mounted in a movable object such as an automobile. The cooling unit is a heat transport system for efficiently using exhaust heat radiated from a power source such as an internal combustion engine or an electric motor, for example. However, a use for the sealing structure 100 is not limited to the above example.

As shown in FIG. 1, the sealing structure 100 according to this embodiment includes a first member 10, a second member 20, and a sealing device 30. The first member 10 and the second member 20 are pipes that are connected to each other to constitute a flow path of a refrigerant. The sealing device 30 is a tubular structure provided between the first member 10 and the second member 20. The sealing device 30 seals the flow path of the refrigerant at a boundary between the first member 10 and the second member 20. The first member 10, the second member 20, and the sealing device 30 are arranged concentrically.

In FIG. 1, a central axis Z of the sealing device 30 is shown. In the following description, a direction along the central axis Z is denoted as a direction Z1, and a direction opposite to the direction Z1 is denoted as a direction Z2. A direction of a circumference of a virtual circle that has a freely selected diameter and a center disposed at the central axis Z is denoted as a "circumferential direction," and a direction of a radius of the virtual circle is denoted as a "radial direction." A direction along the radial direction and toward the central axis Z is denoted as an "inward direction", and a direction along the radial direction and opposite to a direction toward the central axis Z is denoted as an "outward direction."

The first member 10 is a tubular structure having a first surface E1. The first surface E1 is an end surface of the first member 10 facing in the direction Z2. Specifically, the first surface E1 is a flat surface perpendicular to the central axis Z of the sealing device 30.

Within the first member 10, a first space S1 and a first flow path P1 are provided. The first surface E1 is provided with the first space S1 that is open. Specifically, the first space S1 is a cylindrical space having an inner diameter Da1 and having a cross-sectional shape of a circle. The first flow path P1 is a refrigerant flow path that is in communication with the first space S1. The first flow path P1 is disposed in the direction Z1 from the first space S1, for example.

The second member 20 is a tubular structure having a second surface E2. The second surface E2 is an end surface of the second member 20 facing in the direction Z1. Specifically, the second surface E2 is a flat surface perpendicular to the central axis Z of the sealing device 30. The first surface E1 of the first member 10 and the second surface E2 of the second member 20 face each other. Specifically, the first member 10 and the second member 20 are connected to each other in a state in which the first surface E1 and the second surface E2 are in contact with each other.

Within the second member 20, a second space S2 and a second flow path P2 are provided. The second surface E2 is provided with the second space S2 that is open. Specifically, the second space S2 is a cylindrical space having an inner diameter Da2 and having a cross-sectional shape of a circle. The second flow path P2 is a refrigerant flow path that is in communication with the second space S2. The second flow path P2 is disposed in the direction Z2 from the second space S2, for example.

The inner diameter Da2 of the second space S2 is greater than the inner diameter Da1 of the first space S1 (Da2>Da1). In other words, the second space S2 is greater in diameter than the first space S1. Thus, in a state in which the first member 10 and the second member 20 are connected to each other, a step surface X facing in the direction Z2 is continuous with an area in which the first surface E1 and the second surface E2 are in contact with each other. The step surface X is a portion of the first surface E1 disposed within the second space S2 as viewed in a direction along the central axis Z. In other words, the step surface X is an annular flat surface [width=(Da2−Da1)/2] along an inner peripheral edge of the first surface E1.

The sealing device 30 is accommodated in a space S constituted of the first space S1 and the second space S2. The sealing device 30 is a joint seal for sealing the space S. Specifically, the sealing device 30 prevents the refrigerant, which flows through the first flow path P1, the space S, and the second flow path P2, from leaking out from a gap between the first surface E1 and the second surface E2.

Figure 2:
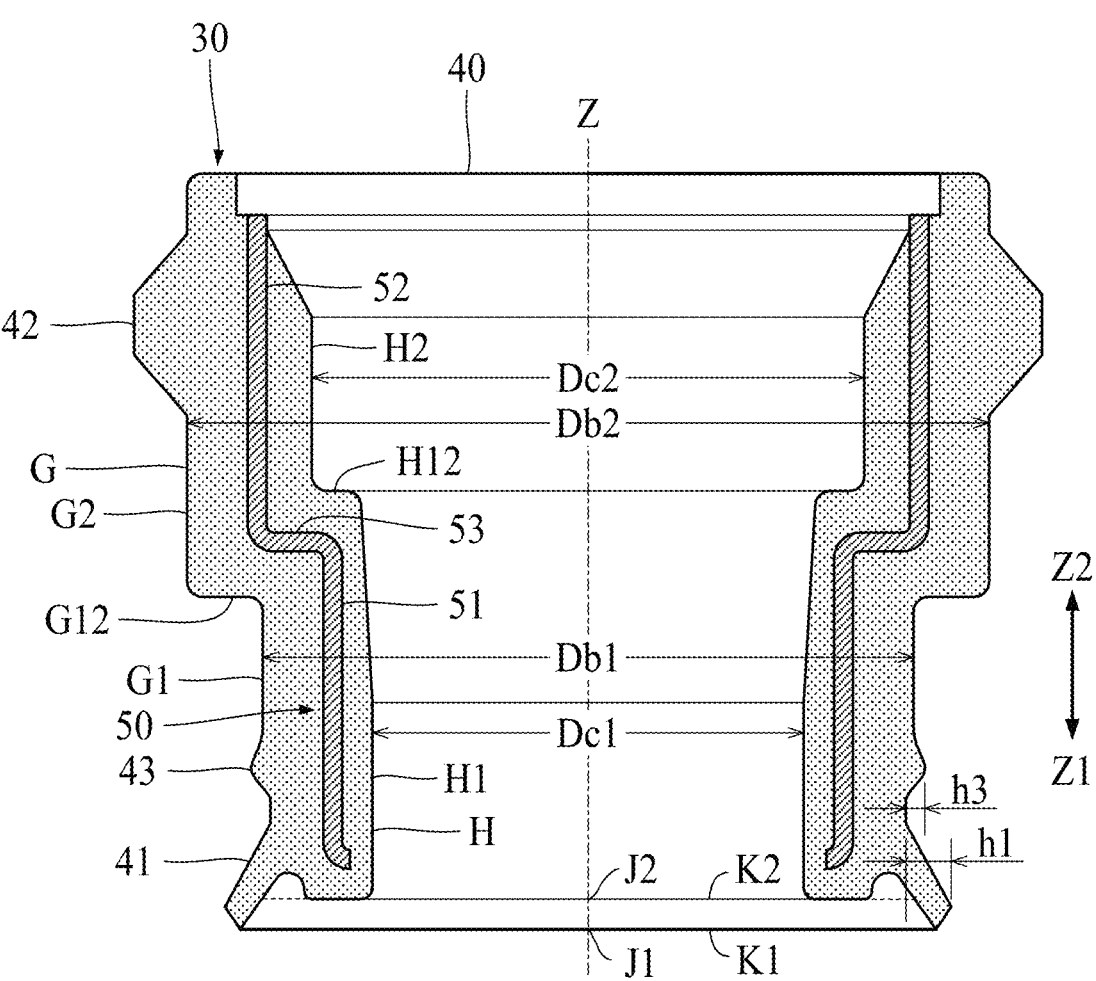
FIG. 2 is a cross section of a sealing device.

FIG. 2 is a cross section of the sealing device 30 that is not accommodated in the space S. As shown in FIG. 2, the sealing device 30 includes an elastic body 40 and a reinforcement 50. The sealing device 30 is a molded product that includes the elastic body 40 and the reinforcement 50 that are integrally formed by insert molding.

The elastic body 40 is an elastically deformable tubular structure. The elastic body 40 is made of an elastic material such as a rubber material. For example, the elastic body 40 may be made of a rubber material, such as chloroprene rubber (CR), silicone rubber (SR), acrylic rubber (ACM), urethane rubber (U), polyurethane rubber (PUR), vinyl methyl silicone rubber (VMQ), ethylene propylene diene rubber (EPDM), or fluorine rubber (FKM).

The reinforcement 50 is a tubular structure that is more rigid than the elastic body 40. The reinforcement 50 increases mechanical strength of the sealing device 30. Most of the reinforcement 50 is covered with the elastic body 40. In other words, the reinforcement 50 is embedded in the elastic body 40. The reinforcement 50 is made of a metal material, for example. For example, the reinforcement 50 may be made of a metal material, such as stainless steel, steel plate cold commercial (SPCC), or steel plate hot commercial (SPHC). It should be noted that the reinforcement 50 may be made of a resin material that is more rigid than the elastic body 40, for example. As described above, in this embodiment, the reinforcement 50 is provided that is more rigid than the elastic body 40. Thus, compared to a configuration in which the sealing device 30 is constituted of only the elastic body 40, it is possible to appropriately maintain mechanical strength of the sealing device 30.

As shown in FIG. 2, the elastic body 40 includes an outer circumferential surface G and an inner circumferential surface H. The outer circumferential surface G is an outer surface of the elastic body 40. The inner circumferential surface H is an inner surface of the elastic body 40.

The outer circumferential surface G of the elastic body 40 includes a first outer circumferential surface G1 and a second outer circumferential surface G2. The first outer circumferential surface G1 is disposed in the direction Z1 from the second outer circumferential surface G2. As shown in FIG. 1, the first outer circumferential surface G1 is a cylindrical surface of the outer circumferential surface G facing an inner circumferential surface F1 defining the first space S1 across a space. The second outer circumferential surface G2 is a cylindrical surface of the outer circumferential surface G facing an inner circumferential surface F2 defining the second space S2 across a space.

An outer diameter Db2 of the second outer circumferential surface G2 is greater than an outer diameter Db1 of the first outer circumferential surface G1 (Db2>Db1). In other words, the second outer circumferential surface G2 is greater in diameter than the first outer circumferential surface G1. Thus, a step surface G12 facing in the direction Z1 is provided between the first outer circumferential surface G1 and the second outer circumferential surface G2. The step surface G12 defines a difference in level between the first outer circumferential surface G1 and the second outer circumferential surface G2. In other words, the step surface G12 is an annular flat surface [width=(Db2−Db1)/2] perpendicular to the central axis Z. As will be understood from the above description, the first outer circumferential surface G1 is a portion of the outer circumferential surface G disposed in the direction Z1 from the step surface G12, whereas the second outer circumferential surface G2 is a portion of the outer circumferential surface G disposed in the direction Z2 from the step surface G12. As shown in FIG. 1, the step surface G12 of the elastic body 40 is in contact with the step surface X formed by the first member 10 and the second member 20.

As shown in FIG. 2, the elastic body 40 includes a first protrusion 41, a second protrusion 42, and a third protrusion 43. The first protrusion 41 and the third protrusion 43 protrude radially outward from the first outer circumferential surface G1. The second protrusion 42 protrudes radially outward from the second outer circumferential surface G2. In other words, the second protrusion 42 is disposed in the direction Z2 from the first protrusion 41. The third protrusion 43 is disposed between the first protrusion 41 and the second protrusion 42.

The first protrusion 41 is disposed at a portion of the first outer circumferential surface G1 in a vicinity of an end of the first outer circumferential surface G1 in the direction Z1. The first protrusion 41 is an annular protrusion over an entire circumference of the first outer circumferential surface G1. Specifically, the first protrusion 41 is a frustoconical sealing lip. A diameter of the sealing lip in a first plane K1 including a first point J1 on the central axis Z is greater than a diameter of the sealing lip in a second plane K2 including a second point J2 on the central axis Z. The first plane K1 and the second plane K2 are perpendicular to the central axis Z. The first point J1 is farther from the step surface G12 than the second point J2. In other words, an outer diameter of a distal end of the first protrusion 41 is greater than an outer diameter of a proximal end of the first protrusion 41. The direction Z1 is a direction in which an object moves away from the step surface G12 along the central axis Z. Thus, the first protrusion 41 is an annular protrusion, a diameter of which in the first plane K1 is greater than a diameter of the annular protrusion in the second plane K2.

As shown in FIG. 1, in a state in which the sealing device 30 is disposed in the space S, the first protrusion 41 is in contact with the inner circumferential surface F1 defining the first space S1. The first protrusion 41 is pressed inwardly by the inner circumferential surface F1 defining the first space S1; thus, the first protrusion 41 is radially inward curved. A portion of the first protrusion 41 in contact with the inner circumferential surface F1 is a sealing surface.

In FIG. 2, the second protrusion 42 is disposed at a portion of the second outer circumferential surface G2 in a vicinity of an end of the second outer circumferential surface G2 in the direction Z2. The second protrusion 42 is an annular protrusion over an entire circumference of the second outer circumferential surface G2. Specifically, the second protrusion 42 is a bead protruding radially from the second outer circumferential surface G2. For example, a cross-sectional shape of the second protrusion 42 is trapezoidal (specifically, an isosceles trapezoid).

As shown in FIG. 1, in a state in which the sealing device 30 is disposed in the space S, the second protrusion 42 is in contact with the inner circumferential surface F2 defining the second space S2. The second protrusion 42 is pressed inwardly by the inner circumferential surface F2 defining the second space S2; thus, the second protrusion 42 is radially inwardly compressed. A portion of the second protrusion 42 in contact with the inner circumferential surface F2 is a sealing surface.

In FIG. 2, the third protrusion 43, together with the first protrusion 41, is provided on the first outer circumferential surface G1. Specifically, the third protrusion 43 is provided in a vicinity of the proximal end of the first protrusion 41. In other words, the third protrusion 43 is provided between the first protrusion 41 and the step surface G12 and protrudes radially outward from the first outer circumferential surface G1. The third protrusion 43 is an annular protrusion over an entire circumference of the first outer circumferential surface G1.

As shown in FIG. 2, a height h3 of the third protrusion 43 is less than a height h1 of the first protrusion 41 (h3>h1). In other words, the distal end of the first protrusion 41 is radially outwardly spaced apart from the top of the third protrusion 43. The height h1 of the first protrusion 41 denotes a distance between the first outer circumferential surface G1 and the distal end of the first protrusion 41. The height h3 of the third protrusion 43 denotes a distance between the first outer circumferential surface G1 and the top of the third protrusion 43. As described above, the height h3 of the third protrusion 43 is less than the height h1 of the first protrusion 41. Thus, in a state shown in FIG. 1 in which the sealing device 30 is accommodated in the space S, the first protrusion 41 is in contact with the inner circumferential surface F1 defining the first space S1, whereas the third protrusion 43 is not in contact with the inner circumferential surface F1. In other words, the third protrusion 43 faces the inner circumferential surface F1 across a space.

The inner circumferential surface H of the elastic body 40 includes a first inner circumferential surface H1 and a second inner circumferential surface H2. The first inner circumferential surface H1 is disposed in the direction Z1 from the second inner circumferential surface H2. Specifically, the first inner circumferential surface H1 is a portion of the inner circumferential surface H corresponding to the first outer circumferential surface G1. On the other hand, the second inner circumferential surface H2 is a portion of the inner circumferential surface H corresponding to the second outer circumferential surface G2.

An inner diameter Dc2 of the second inner circumferential surface H2 is greater than an inner diameter Dc1 of the first inner circumferential surface H1 (Dc2>Dc1). In other words, the second inner circumferential surface H2 is greater in diameter than the first inner circumferential surface H1. Thus, an annular step surface H12 facing in the direction Z2 is provided between the first inner circumferential surface H1 and the second inner circumferential surface H2.

As described above, in this embodiment, the diameter of the second inner circumferential surface H2 of the elastic body 40 is greater than the diameter of the first inner circumferential surface H1. Thus, compared to a configuration in which the diameter of the second inner circumferential surface H2 of the elastic body 40 is the same as the diameter of the first inner circumferential surface H1 (for example, a configuration shown in FIG. 8), it is possible to reduce the amount of material used for the elastic body 40.

As shown in FIG. 2, the reinforcement 50 of the sealing device 30 is a structure that includes a first portion 51, a second portion 52, and a step portion 53 that are integrally formed. For example, the reinforcement 50 is produced by stamping a metal ring.

The first portion 51 is a tubular portion of the reinforcement 50 that is disposed in the direction Z1. Specifically, the first portion 51 is a cylindrical portion of the reinforcement 50 corresponding to the inner circumferential surface F1 of the first member 10. Thus, the first portion 51 is disposed inside the first outer circumferential surface G1 of the elastic body 40.

The second portion 52 is a tubular portion of the reinforcement 50 that is disposed in the direction Z2. Specifically, the second portion 52 is a cylindrical portion of the reinforcement 50 corresponding to the inner circumferential surface F2 of the second member 20. Thus, the second portion 52 is disposed inside the second outer circumferential surface G2 of the elastic body 40.

The step portion 53 is a portion of the reinforcement 50 that connects the first portion 51 and the second portion 52 to each other. As shown in FIG. 2, a diameter of the second portion 52 is greater than a diameter of the first portion 51. The step portion 53 defines a difference in level between the first portion 51 and the second portion 52. In other words, the step portion 53 is an annular flat portion of the reinforcement 50 perpendicular to the central axis Z. As viewed in the direction along the central axis Z, the step portion 53 of the reinforcement 50 is disposed between the step surface G12 of the outer circumferential surface G and the step surface H12 of the inner circumferential surface H.

In the above configuration, for example, due to error such as production error or assembly error, the first space S1 and the second space S2 may be eccentric relative to each other. For example, in FIG. 3 and in FIG. 4, a central axis of the second space S2 shifts leftward from a central axis of the first space S1. In a state in which the first space S1 and the second space S2 are eccentric relative to each other, the central axis Z of the sealing device 30 is inclined relative to a central axis of the space S that constituted of the first space S1 and the second space S2. In other words, the sealing device 30 is eccentric relative to the first space S1.

Figure 3:
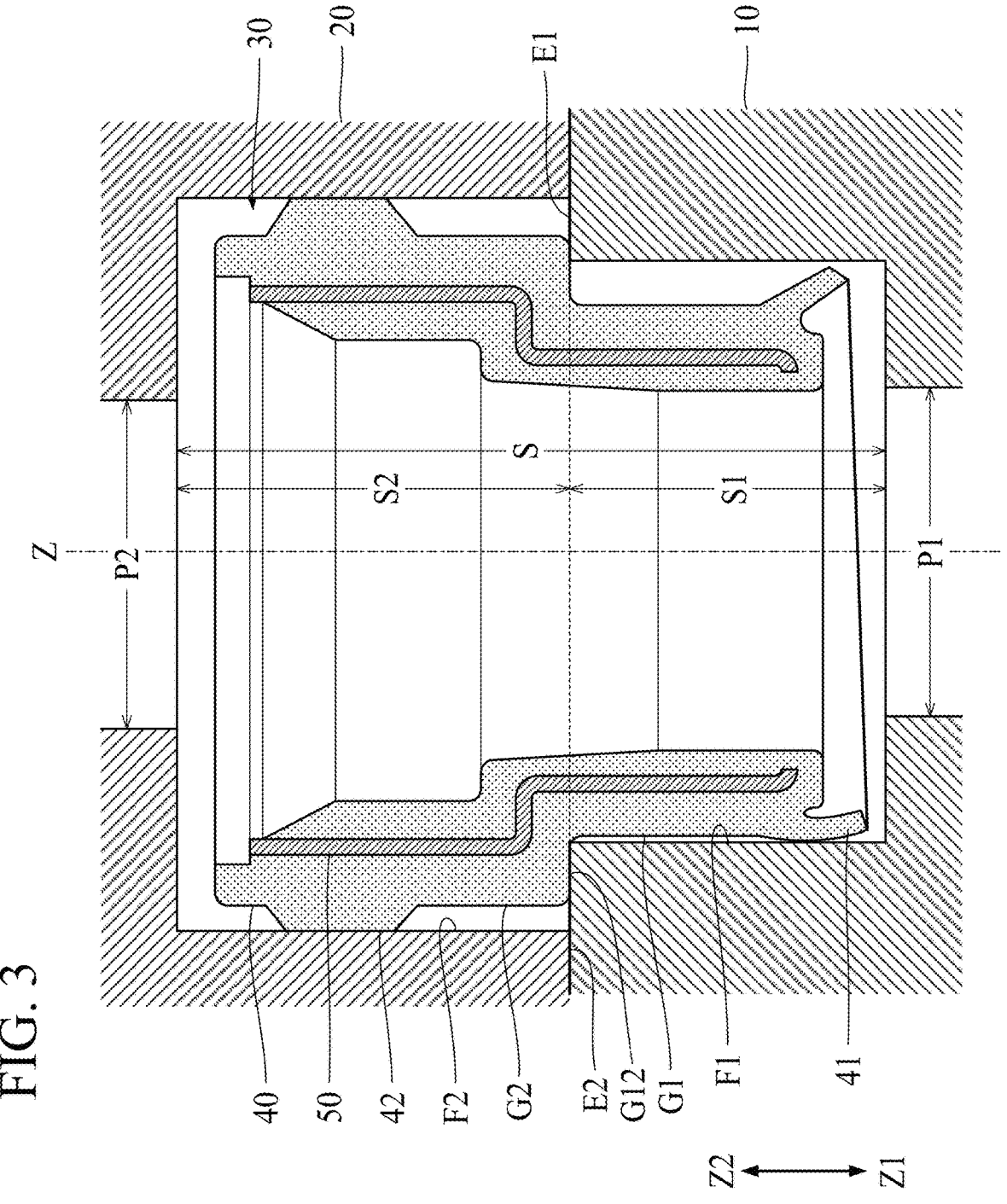
FIG. 3 is a cross section of a sealing structure according to a comparative example.

FIG. 3 shows a configuration in which the third protrusion 43 is not provided (hereinafter referred to as a "comparative example"). As shown in FIG. 3, in the comparative example, when the sealing device 30 is eccentric relative to the first space S1, the first outer circumferential surface G1 of the sealing device 30 may be excessively close to the inner circumferential surface F1 defining the first space S1. In a state in which the first outer circumferential surface G1 is excessively close to the inner circumferential surface F1, a portion of the first protrusion 41 that is in contact with the inner circumferential surface F1 (a left portion shown in FIG. 3) is pressed by the inner circumferential surface F1 to be excessively deformed, and a portion of the first protrusion 41 that is opposite to the portion of the first protrusion 41 in contact with the inner circumferential surface F1 (a right portion shown in FIG. 3) may not have sufficient deformation and cannot maintain a sufficient sealing performance. In other words, in the comparative example, when the sealing device 30 is eccentric relative to the first space S1, appropriate interference caused by the first protrusion 41 may not be maintained.

Figure 4:
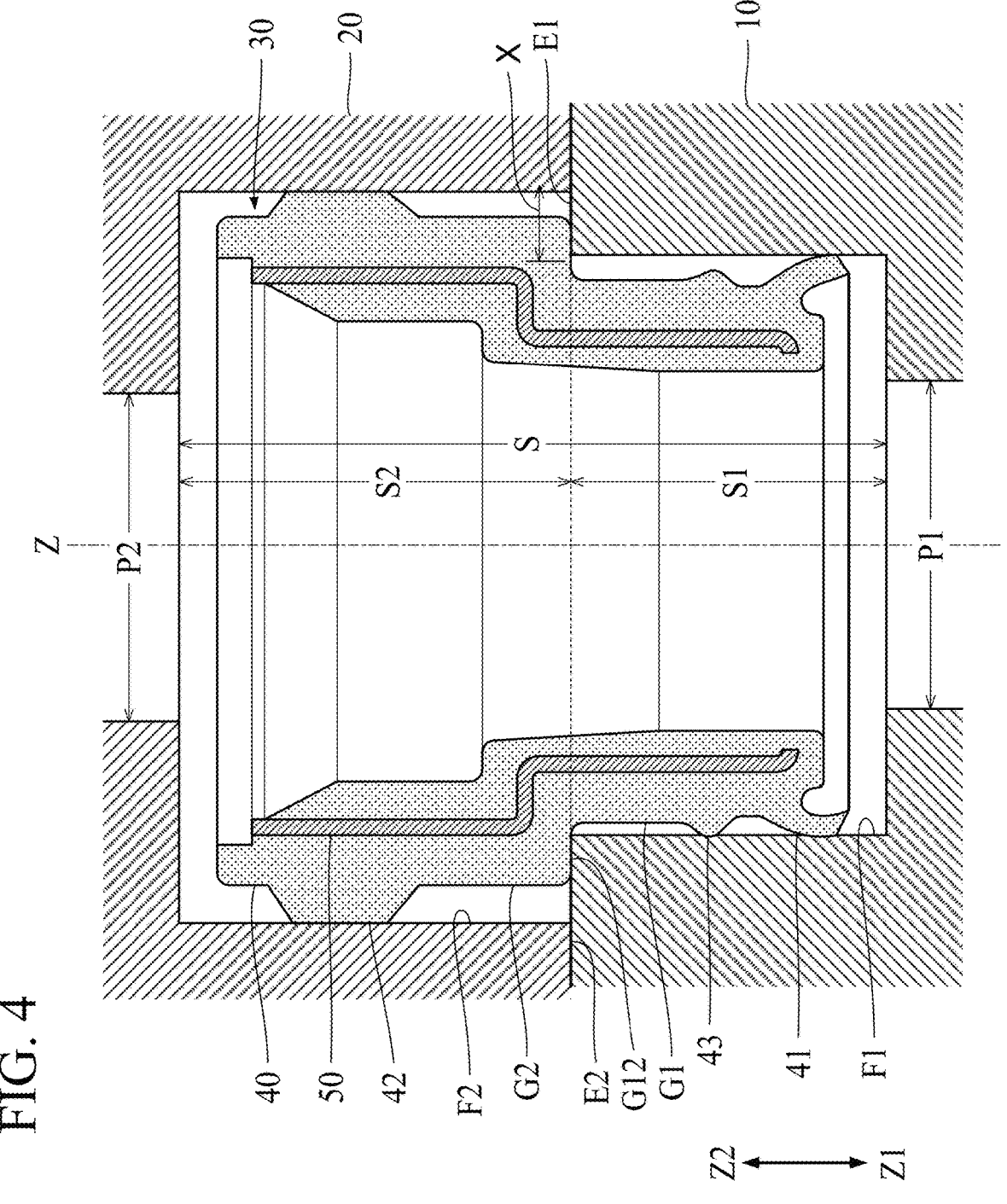
FIG. 4 is an explanatory diagram showing effects of this embodiment.

In contrast to the comparative example, in this embodiment, the first outer circumferential surface G1 is provided with the third protrusion 43. If the sealing device 30 is eccentric relative to the first space S1, as shown in FIG. 4, the third protrusion 43 comes into contact with the inner circumferential surface F1 defining the first space S1. Thus, it is possible to substantially prevent greater eccentricity of the sealing device 30. In other words, it is possible to substantially prevent excessive eccentricity of the sealing device 30 relative to the first space S1. Thus, it is possible to reduce excessive or insufficient deformation of the first protrusion 41 due to eccentricity of the sealing device 30; as a result, it is possible to maintain appropriate interference caused by the first protrusion 41. In other words, it is possible to appropriately ensure a sealing performance caused by the first protrusion 41.

In particular, the third protrusion 43 according to this embodiment is annular. Thus, if the sealing device 30 is eccentric relative to the first space S1 in a direction in a plane perpendicular to the central axis Z, it is possible to substantially prevent the first outer circumferential surface G1 from being excessively close to the inner circumferential surface F1 defining the first space S1. Consequently, the above-described effect of maintaining appropriate interference, which is caused by the first protrusion 41 and the inner circumferential surface F1 defining the first space S1, is particularly significant.

Figure 5:
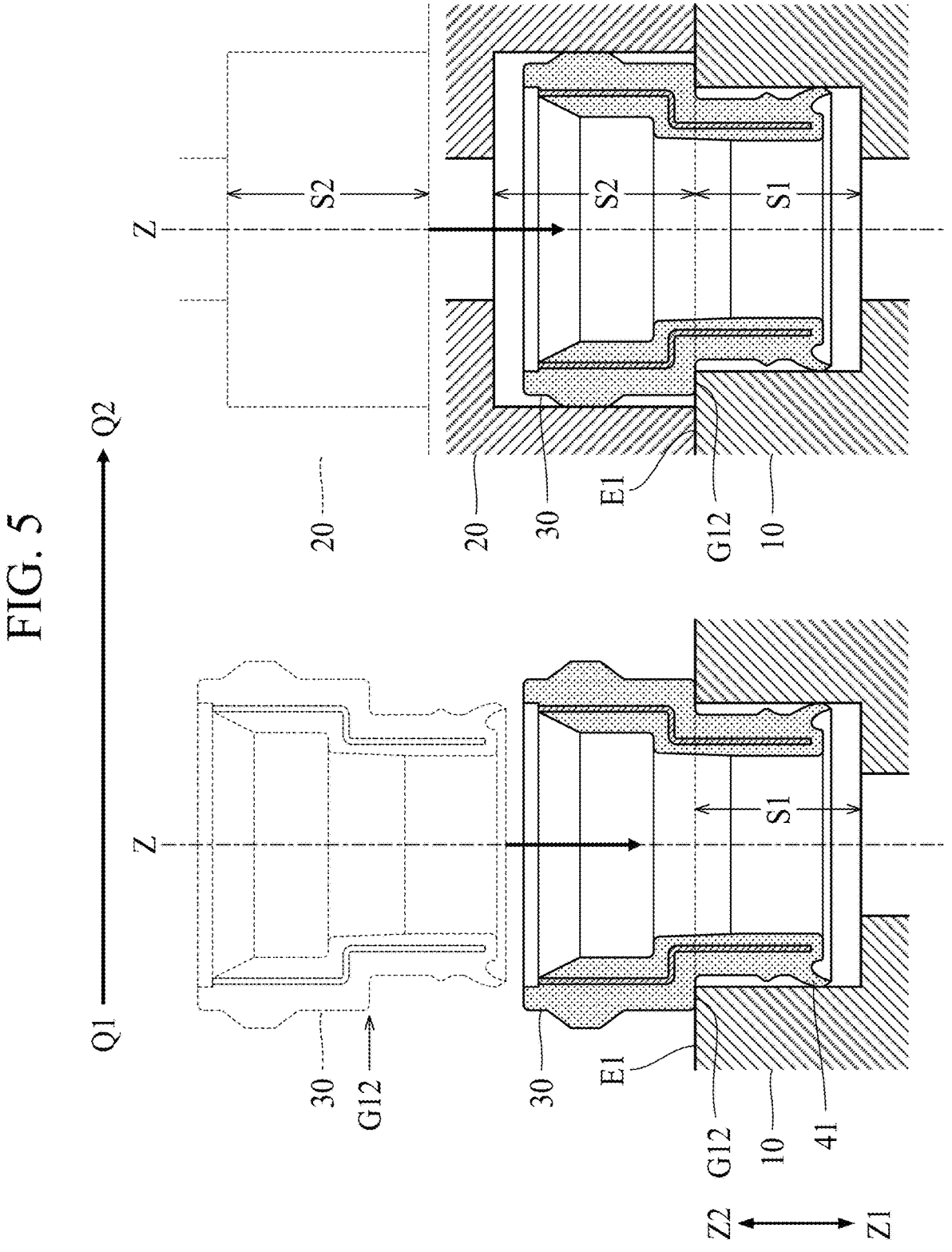
FIG. 5 is an explanatory diagram showing a production process for the sealing structure.

FIG. 5 is a diagram showing an assembly process for the sealing structure 100. As shown in FIG. 5, at process Q1, a portion of the sealing device 30 in the direction Z1 is accommodated into the first space S1 of the first member 10. Specifically, first, in a state in which the first protrusion 41 is radially inward curved, the sealing device 30 is moved in the direction Z1 to cause the first protrusion 41 to enter into the first space S1. Until the step surface G12 of the elastic body 40 comes into contact with the first surface E1 (the step surface X) of the first member 10, the sealing device 30 is moved in the direction Z1. When the step surface G12 of the elastic body 40 comes into contact with the first surface E1 (the step surface X), the position of the sealing device 30 relative to the first member 10 in the direction along the central axis Z is determined.

At process Q2 after the execution of process Q1, the first member 10 is joined to the second member 20. Specifically, the second member 20 is moved in the direction Z1 to be close to the first member 10 such that a portion of the sealing device 30 in the direction Z2 is accommodated in the second space S2 of the second member 20. At a stage at which the second surface E2 of the second member 20 comes into contact with the first surface E1 of the first member 10, the first member 10 and the second member 20 are fixed to each other by fasteners (not shown) such as screws or bolts, for example. Through the above-described processes, the sealing structure 100 is produced.

As described above, in this embodiment, the first protrusion 41 is in contact with the inner circumferential surface F1 defining the first space S1, and the second protrusion 42 is in contact with the inner circumferential surface F2 defining the second space S2. Thus, the first space S1 and the second space S2 are sealed and are connected to each other. In addition, the step surface G12 of the elastic body 40 is in contact with the first surface E1. Thus, it is possible to fix the position of the sealing device 30 in the direction along the central axis Z. In other words, in a state in which the first protrusion 41 and the second protrusion 42 maintain a sealing performance, it is possible to implement positioning of the sealing device 30 in the direction along the central axis Z.

In this embodiment, the first protrusion 41 is constituted of a sealing lip, and the second protrusion 42 is constituted of a bead. Generally, a sealing lip is more easily deformed in a radial direction than a bead. At process Q1 at which a portion of the elastic body 40 corresponding to the first outer circumferential surface G1 is accommodated into the first space S1, the first protrusion 41 (sealing lip) is deformed; thus, it is possible to easily insert the elastic body 40 into the first space S1, and the step surface G12 of the elastic body 40 comes into contact with the first surface E1; thus, it is possible to determine the position of the sealing device 30 in the direction along the central axis Z.

In this embodiment, the reinforcement 50 is provided so as to extend in both a portion of the elastic body 40 corresponding to the first outer circumferential surface G1 and a portion of the elastic body 40 corresponding to the second outer circumferential surface G2. Thus, compared to a configuration in which the reinforcement 50 is provided so as to extend in either the portion of the elastic body 40 corresponding to the first outer circumferential surface G1 or the portion of the elastic body 40 corresponding to the second outer circumferential surface G2, or compared to a configuration in which the first portion 51 and the second portion 52 are separated from each other (for example, a configuration shown in FIG. 10), it is possible to appropriately maintain mechanical strength throughout the sealing device 30. For example, it is possible to ensure mechanical strength of a portion of the elastic body 40 in a vicinity of the step surface G12. Thus, it is possible to appropriately implement positioning of the sealing device 30 caused by the step surface G12 that is in contact with the first surface E1. In particular, the reinforcement 50 according to this embodiment includes the step portion 53. Thus, it is easy to ensure mechanical strength of the portion of the elastic body 40 in a vicinity of the step surface G12. Consequently, it is possible to easily and reliably implement positioning of the sealing device 30 caused by the step surface G12 that is in contact with the first surface E1.

B: Modifications

Specific modifications that may be applied to the above-described embodiment are described below. Two or more modifications freely selected from the following modifications may be combined as long as no conflict arises from such combination.

Figure 6:
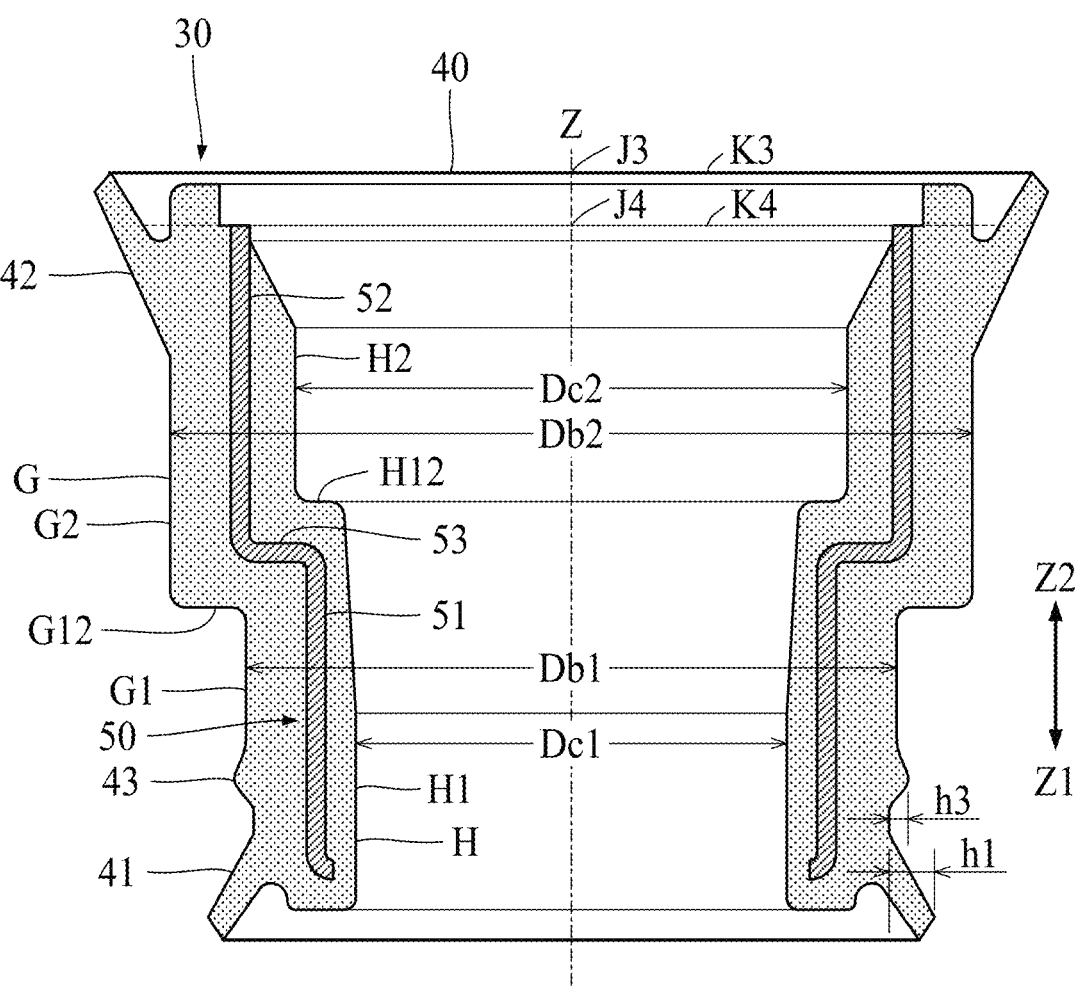
FIG. 6 is a cross section of a sealing device according to a modification.

(1) In the above-described embodiment, a configuration is described in which the second protrusion 42 is a bead. However, the second protrusion 42 is not limited to the example described above. For example, as shown in FIG. 6, the second protrusion 42 may be constituted of a sealing lip. The second protrusion 42 shown in FIG. 6 is a frustoconical sealing lip. A diameter of the sealing lip in a third plane K3 including a third point J3 on the central axis Z is greater than a diameter of the sealing lip in a fourth plane K4 including a fourth point J4 on the central axis Z. The third plane K3 and the fourth plane K4 are perpendicular to the central axis Z. The third point J3 is farther from the step surface G12 than the fourth point J4. In addition, in the above-described embodiment, a configuration is described in which the first protrusion 41 is a sealing lip. However, the first protrusion 41 may be constituted of a bead.

Figure 7:
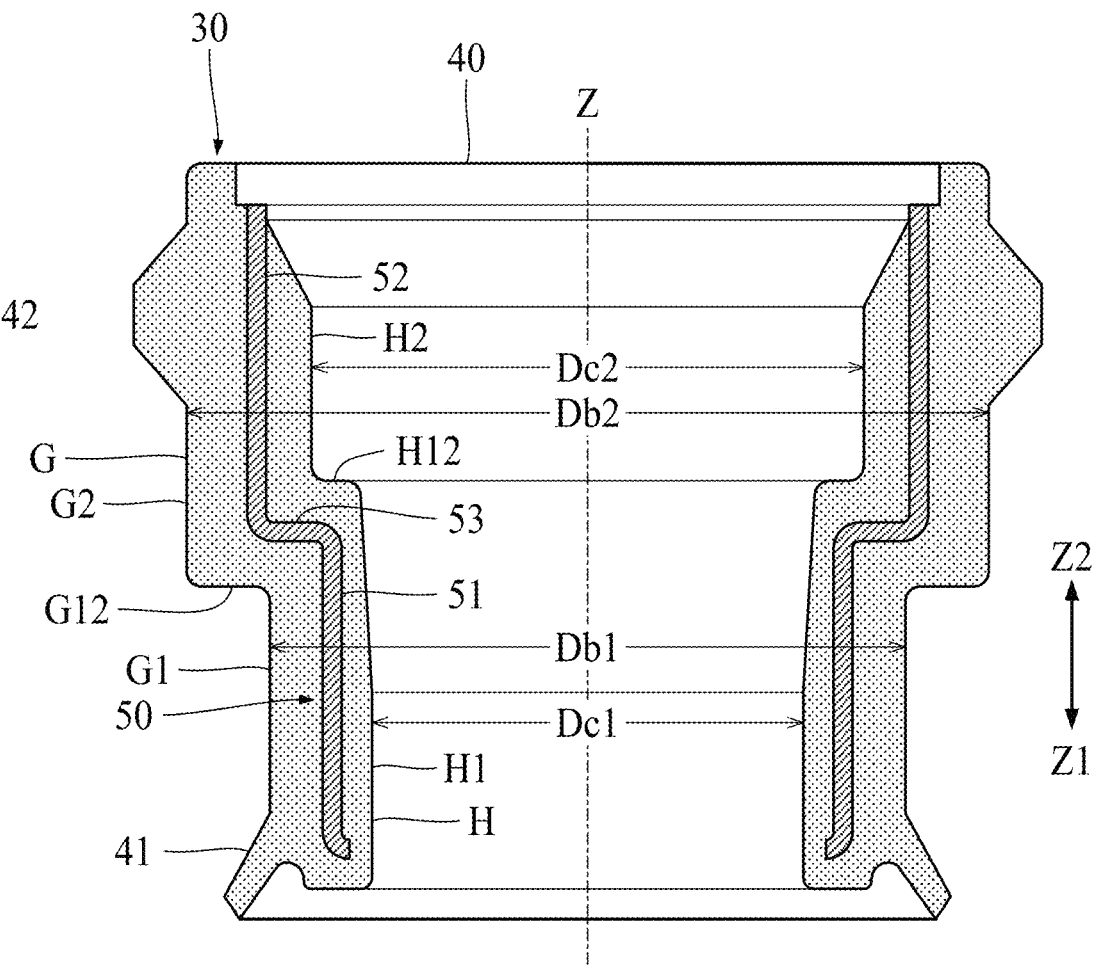
FIG. 7 is a cross section of a sealing device according to another modification.

(2) In the above-described embodiment, a configuration is described in which the elastic body 40 includes the third protrusion 43. However, the third protrusion 43 may be omitted, as shown in FIG. 7. In other words, the comparative example shown in FIG. 3 is included within the scope of this disclosure.

(3) In the above-described embodiment, a configuration is described in which the third protrusion 43 faces the inner circumferential surface F1 across a space in a standard state in which the sealing device 30 and the first member 10 are disposed concentrically. However, in the standard state, the third protrusion 43 may be in contact with the inner circumferential surface F1 of the first member 10.

(4) In the above-described embodiment, a configuration is described in which the difference in level is provided between the first inner circumferential surface H1 and the second inner circumferential surface H2 included in the inner circumferential surface H of the elastic body

Figure 8:
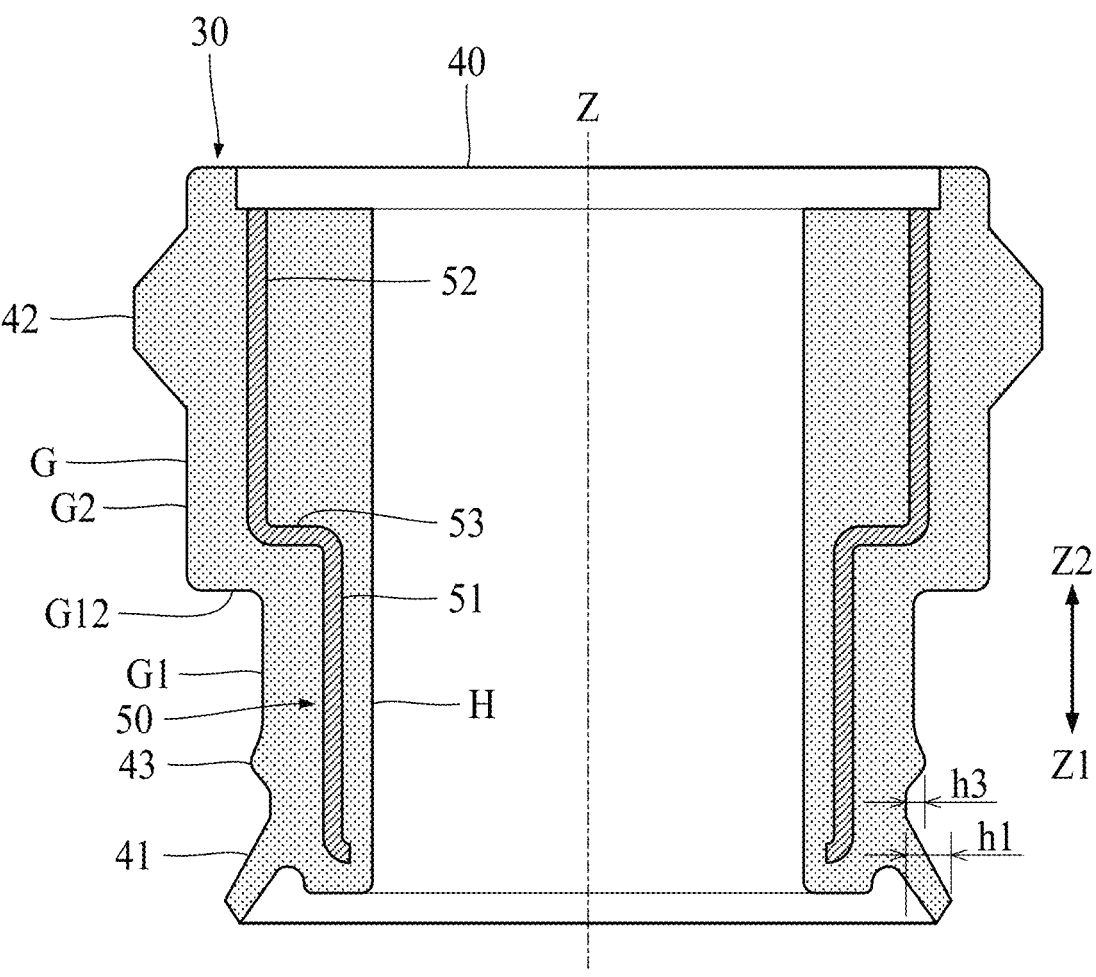
FIG. 8 is a cross section of a sealing device according to yet another modification.

40. However, the difference in level included in the inner circumferential surface H may be omitted. For example, as shown in FIG. 8, the inner circumferential surface H of the elastic body 40 may be a simple cylindrical surface with an inner diameter that is substantially constant.

Figure 9:
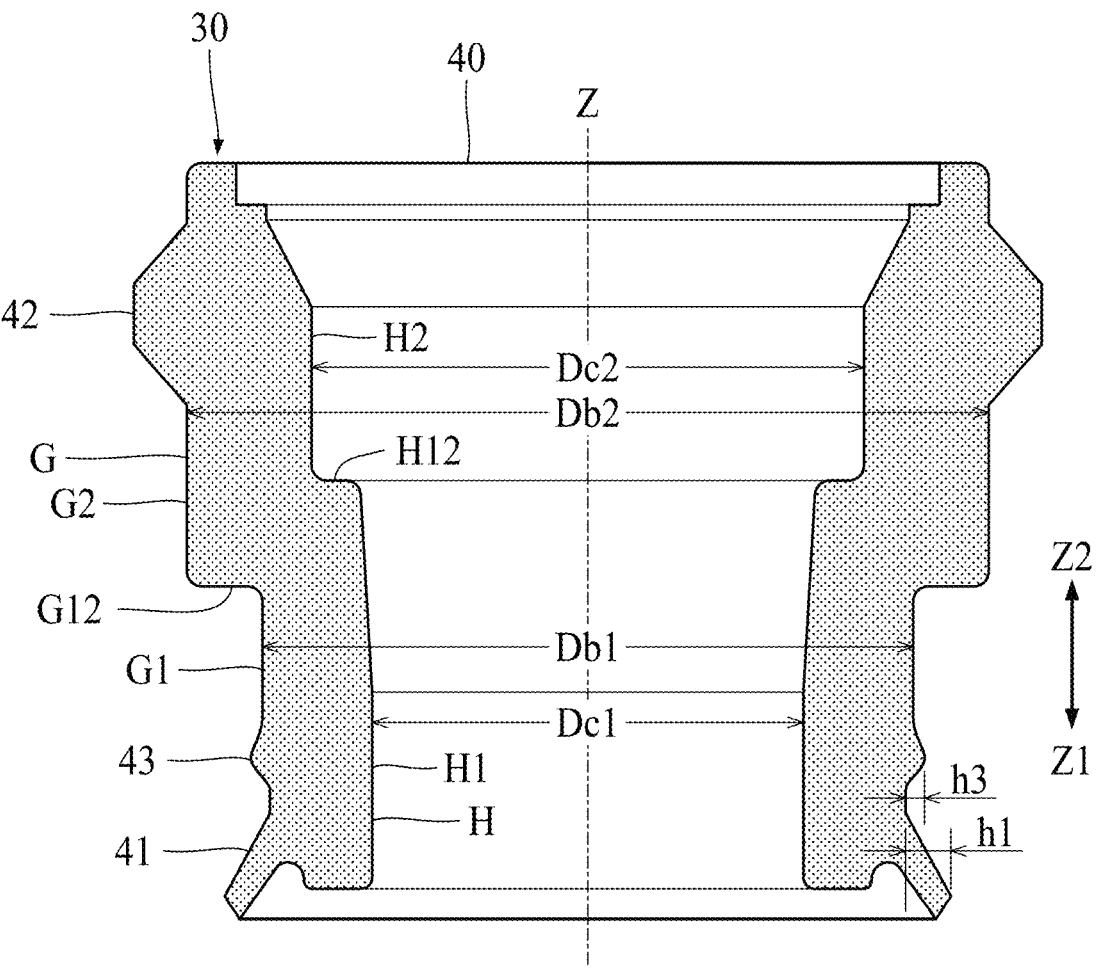
FIG. 9 is a cross section of a sealing device according to yet another modification.

(5) In the above-described embodiment, a configuration is described in which the sealing device 30 includes the elastic body 40 and the reinforcement 50. However, as shown in FIG. 9, the reinforcement 50 may be omitted. In other words, the sealing device 30 may be constituted of only the elastic body 40.

Figure 10:
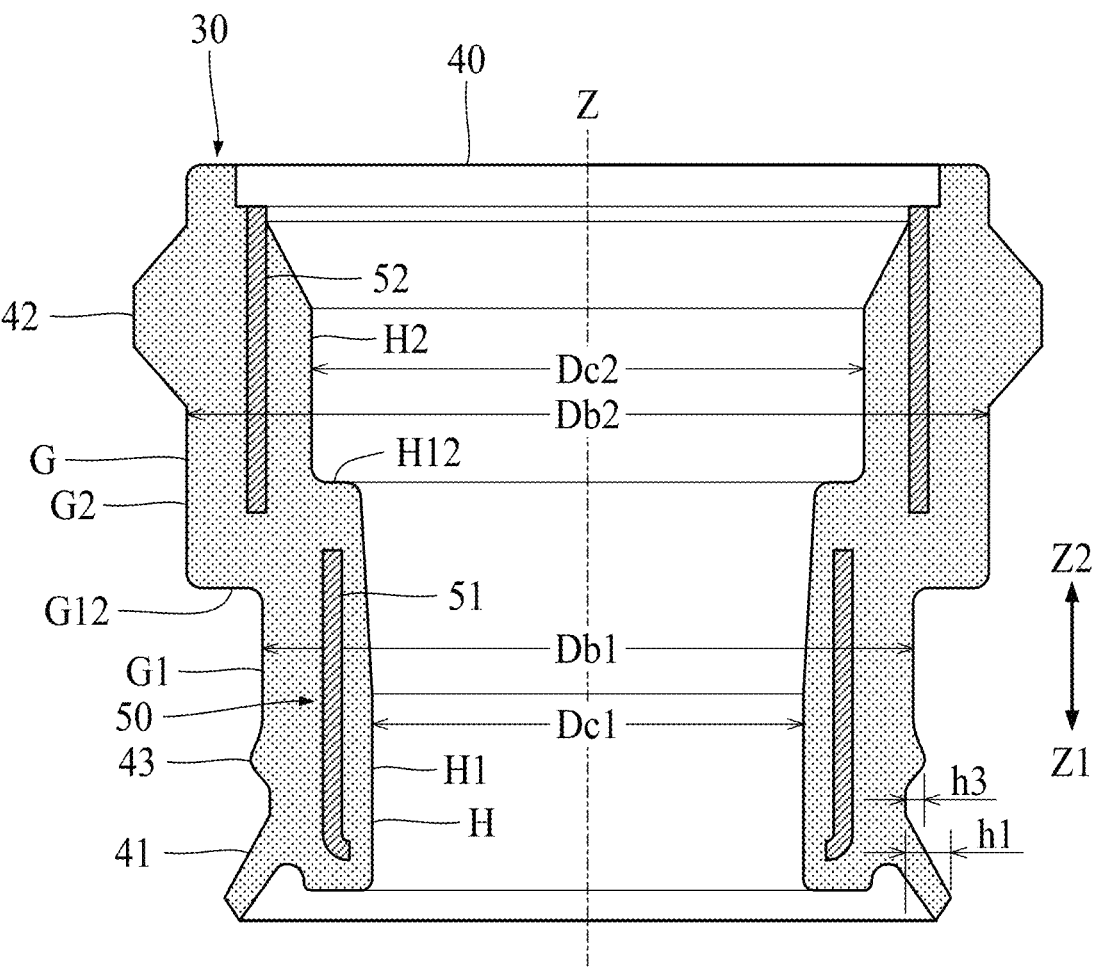
FIG. 10 is a cross section of a sealing device according to yet another modification.

(6) In the above-described embodiment, the single reinforcement 50 is described in which the first portion 51 and the second portion 52 are connected to each other via the step portion 53. However, the reinforcement 50 is not limited to the example described above. For example, as shown in FIG. 10, the first portion 51 and the second portion 52 that are included in the reinforcement 50 may be separate from each other. Alternatively, one of the first portion 51 and the second portion 52 shown in FIG. 10 may be omitted.

(7) In the above-described embodiment, a configuration is described in which the third protrusion 43 is annular. However, a shape of the third protrusion 43 is not limited to the example described above. For example, the third protrusion 43 may be constituted of a plurality of protrusions arranged at intervals from one another along a circumferential direction of the first outer circumferential surface G1. However, according to a configuration of the above-described embodiment in which the third protrusion 43 is annular, as described above, it is possible to substantially prevent the first outer circumferential surface G1 from being excessively close to the inner circumferential surface F1 defining the first space S1 even if the sealing device 30 is eccentric relative to the first space S1 in a direction in a plane perpendicular to the central axis Z.

(8) In this disclosure, reference to an element using the designations "first," "second," etc., is used only for convenience in distinguishing elements, and has no substantive meaning. Thus, a position of each of an element, an order of manufacture of the elements, etc., are not limited by a reference to an element using the designations "first," "second," etc.

C: Supplemental Notes

The following configurations are derivable from the foregoing embodiments.

A sealing device according to one aspect (first aspect) of this disclosure is a sealing device configured to be provided between a first member that includes a first surface provided with a first space and a second member that includes a second surface provided with a second space having a diameter greater than a diameter of the first space, the second space facing the first surface, the sealing device comprising a tubular elastic body, wherein the elastic body includes a first outer circumferential surface facing an inner circumferential surface defining the first space; a second outer circumferential surface facing an inner circumferential surface defining the second space, the second outer circumferential surface having a diameter greater than a diameter of the first outer circumferential surface; a step surface defining a difference in level between the first outer circumferential surface and the second outer circumferential surface, the step surface being in contact with the first surface; an annular first protrusion protruding from the first outer circumferential surface; and an annular second protrusion protruding from the second outer circumferential surface. According to this aspect, the first protrusion is in contact with the inner circumferential surface defining the first space, and the second protrusion is in contact with the inner circumferential surface defining the second space. Thus, the first space and the second space are sealed and are connected to each other. In addition, the step surface of the elastic body is in contact with the first surface. Thus, it is possible to fix a position of the sealing device in an axial direction. In other words, in a state in which the first protrusion and the second protrusion maintain sealing performance, it is possible to implement positioning of the sealing device in the axial direction.

In a specific example (second aspect) of the first aspect, the first protrusion is a sealing lip. A diameter of the sealing lip in a first plane including a first point on a central axis of the elastic body is greater than a diameter of the sealing lip in a second plane including a second point on the central axis. The first plane and the second plane are perpendicular to the central axis. The first point is farther from the step surface than the second point, and the second protrusion is a bead protruding radially from the second outer circumferential surface. According to this aspect, the sealing lip is more easily deformed in a radial direction than the bead. In a process at which a portion of the elastic body corresponding to the first outer circumferential surface is accommodated in the first space, the sealing lip is deformed; thus, it is possible to easily insert the elastic body into the first space, and the step surface of the elastic body is in contact with the first surface; thus, it is possible to determine a position of the sealing device in the axial direction.

In a specific example (third aspect) of the first aspect or the second aspect, the sealing device further includes a third protrusion provided between the first protrusion and the step surface, the third protrusion protruding from the first outer circumferential surface, wherein a height of the third protrusion is less than a height of the first protrusion. According to this aspect, if the sealing device is eccentric relative to the first space, the third protrusion comes into contact with the inner circumferential surface defining the first space. Thus, it is possible to substantially prevent the first outer circumferential surface from being excessively close to the inner circumferential surface. In other words, it is possible to reduce the probability that the first protrusion is pressed by the inner circumferential surface defining the first space to be excessively deformed. Thus, it is possible to maintain appropriate interference, which is caused by the first protrusion and the inner circumferential surface defining the first space.

In a specific example (fourth aspect) of the third aspect, the third protrusion has a shape of a ring over an entire circumference of the first outer circumferential surface. According to this aspect, the third protrusion is annular. Thus, even if the sealing device is eccentric relative to the first space in a direction in a plane perpendicular to a central axis, it is possible to substantially prevent the first outer circumferential surface from being excessively close to the inner circumferential surface defining the first space. Thus, the above-described effect of maintaining appropriate interference, which is caused by the first protrusion and the inner circumferential surface defining the first space, is particularly significant.

In a specific example (fifth aspect) of any of the first to fourth aspects, the sealing device further includes a reinforcement that is more rigid than the elastic body. According to this aspect, the reinforcement is provided that is more rigid than the elastic body. Thus, compared to a configuration in which the sealing device is constituted of only the elastic body, mechanical strength of the sealing device can be appropriately maintained.

In a specific example (sixth aspect) of the fifth aspect, the reinforcement is a single body including a tubular first portion disposed inside the first outer circumferential surface, and a tubular second portion disposed inside the second outer circumferential surface. According to this aspect, the reinforcement is provided so as to extend in both a portion of the elastic body corresponding to the first outer circumferential surface and a portion of the elastic body corresponding to the second outer circumferential surface. Thus, compared to a configuration in which the reinforcement is provided so as to extend in either the portion of the elastic body corresponding to the first outer circumferential surface or the portion of the elastic body corresponding to the second outer circumferential surface, or compared to a configuration in which the first portion and the second portion are separate from each other, it is possible to appropriately maintain mechanical strength throughout the sealing device. In particular, it is possible to ensure mechanical strength of a portion of the elastic body in a vicinity of the step surface. Thus, it is possible to appropriately implement positioning of the sealing device caused by the step surface that is in contact with the first surface.

In a specific example (seventh aspect) of the sixth aspect, the second portion has a diameter greater than a diameter of the first portion, and the reinforcement further includes a step portion defining a difference in level between the first portion and the second portion. According to this aspect, the reinforcement includes the step portion. Thus, it is easy to ensure mechanical strength of a portion of the elastic body in a vicinity of the step surface. Consequently, it is possible to easily and reliably implement positioning of the sealing device caused by the step surface that is in contact with the first surface.

In a specific example (eighth aspect) of any of the first to seventh aspects, the elastic body further includes a first inner circumferential surface corresponding to the first outer circumferential surface, and a second inner circumferential surface corresponding to the second outer circumferential surface, the second inner circumferential surface having a diameter greater than a diameter of the first inner circumferential surface. According to this aspect, the diameter of the second inner circumferential surface of the elastic body is greater than the diameter of the first inner circumferential surface. Thus, compared to a configuration in which a diameter of the second inner circumferential surface of the elastic body is the same as a diameter of the first inner circumferential surface, it is possible to reduce the amount of material used for the elastic body.

A sealing structure according to one aspect (ninth aspect) of this disclosure includes a first member that includes a first surface provided with a first space; a second member that includes a second surface provided with a second space having a diameter greater than a diameter of the first space, the second member facing the first surface; and a sealing device provided between the first member and the second member, wherein the sealing device includes a tubular elastic body, and wherein the elastic body includes a first outer circumferential surface facing an inner circumferential surface defining the first space; a second outer circumferential surface facing an inner circumferential surface defining the second space, the second outer circumferential surface having a diameter greater than a diameter of the first outer circumferential surface; a step surface defining a difference in level between the first outer circumferential surface and the second outer circumferential surface, the step surface being in contact with the first surface; an annular first protrusion protruding from the first outer circumferential surface; and an annular second protrusion protruding from the second outer circumferential surface.

DESCRIPTION OF REFERENCE SIGNS

100 . . . sealing structure, 10 . . . first member, 20 . . . second member, 30 . . . sealing device, 40 . . . elastic body, 41 . . . first protrusion, 42 . . . second protrusion, 43 . . . third protrusion, 50 . . . reinforcement, 51 . . . first portion, 52 . . . second portion, 53 . . . step portion.

What is claimed is:

1. A sealing structure comprising:

a first member that includes a first surface provided with a first space;

a second member that includes a second surface provided with a second space having a diameter greater than a diameter of the first space, the second member facing the first surface; and a sealing device provided between the first member and the second member, wherein the sealing device includes a tubular elastic body, and wherein the elastic body includes:

a first outer circumferential surface facing an inner circumferential surface defining the first space;

a second outer circumferential surface facing an inner circumferential surface defining the second space, the second outer circumferential surface having a diameter greater than a diameter of the first outer circumferential surface;

a step surface defining a difference in level between the first outer circumferential surface and the second outer circumferential surface, the step surface being in contact with the first surface;

an annular first protrusion protruding from the first outer circumferential surface; and an annular second protrusion protruding from the second outer circumferential surface.

2. The sealing structure according to claim 1, wherein the first protrusion is a sealing lip, wherein a diameter of the sealing lip in a first plane including a first point on a central axis of the elastic body is greater than a diameter of the sealing lip in a second plane including a second point on the central axis, wherein the first plane and the second plane are perpendicular to the central axis, wherein the first point is farther from the step surface than the second point, and wherein the second protrusion is a bead protruding radially from the second outer circumferential surface.

3. The sealing structure according to claim 1, further comprising a third protrusion provided between the first protrusion and the step surface, the third protrusion protruding from the first outer circumferential surface, wherein a height of the third protrusion is less than a height of the first protrusion.

4. The sealing structure according to claim 3, wherein the third protrusion has a shape of a ring over an entire circumference of the first outer circumferential surface.

5. The sealing structure according to claim 1, further comprising a reinforcement that is more rigid than the elastic body.

6. The sealing structure according to claim 5, wherein the reinforcement is a single body including:

a tubular first portion disposed inside the first outer circumferential surface; and a tubular second portion disposed inside the second outer circumferential surface.

7. The sealing structure according to claim 6, wherein the second portion has a diameter greater than a diameter of the first portion, and wherein the reinforcement further includes a step portion defining a difference in level between the first portion and the second portion.

8. The sealing structure according to claim 1, wherein the elastic body further includes:

a first inner circumferential surface corresponding to the first outer circumferential surface; and a second inner circumferential surface corresponding to the second outer circumferential surface, the second inner circumferential surface having a diameter greater than a diameter of the first inner circumferential surface.

* * * * *